(12) United States Patent
Tsai et al.

(10) Patent No.: US 8,451,403 B2
(45) Date of Patent: May 28, 2013

(54) TRANSFLECTIVE DISPLAY DEVICE AND METHOD FOR ASSEMBLING THE SAME

(75) Inventors: Cheng Yeh Tsai, Banqiao (TW); Mu Kai Kang, Pintung (TW); Heng Cheng Tseng, Chiayi County (TW)

(73) Assignee: Hannstar Display Corp. (TW)

( * ) Notice: Subject to any disclaimer, the term of this patent is extended or adjusted under 35 U.S.C. 154(b) by 687 days.

(21) Appl. No.: 12/646,602

(22) Filed: Dec. 23, 2009

(65) Prior Publication Data

US 2010/0321619 A1    Dec. 23, 2010

(30) Foreign Application Priority Data

Jun. 23, 2009   (TW) ................................ 98120930 A (51) Int. Cl.
*G02F 1/1335* (2006.01)
(52) U.S. Cl.
USPC ............. 349/95; 349/114; 359/618; 359/619; 359/670; 345/88; 362/97.1
(58) Field of Classification Search
USPC ............................ 349/114, 95; 359/618, 670
See application file for complete search history.

(56) References Cited

U.S. PATENT DOCUMENTS

| | | | |
|---|---|---|---|
| 5,430,562 A * | 7/1995 | Fushimi et al. | 349/5 |
| 2002/0130990 A1 * | 9/2002 | Nakamura | 349/95 |
| 2003/0231400 A1 * | 12/2003 | Frosig et al. | 359/619 |
| 2004/0041965 A1 | 3/2004 | Liu | |
| 2004/0240777 A1 * | 12/2004 | Woodgate et al. | 385/16 |
| 2005/0068475 A1 * | 3/2005 | Kume et al. | 349/95 |
| 2006/0061708 A1 * | 3/2006 | Umebayashi et al. | 349/95 |
| 2006/0187379 A1 * | 8/2006 | Yamanaka et al. | 349/95 |
| 2006/0238673 A1 | 10/2006 | Roh | |
| 2008/0074564 A1 * | 3/2008 | Uehara et al. | 349/5 |
| 2008/0180602 A1 | 7/2008 | Hamamoto | |
| 2008/0211995 A1 * | 9/2008 | Jeon et al. | 349/95 |
| 2008/0218461 A1 * | 9/2008 | Sugita et al. | 345/88 |
| 2008/0285136 A1 * | 11/2008 | Jacobowitz et al. | 359/619 |

FOREIGN PATENT DOCUMENTS

| CN | 101452142 | 6/2009 |
|---|---|---|
| TW | 200702866 | 7/1994 |
| TW | 200819829 | 10/1995 |

* cited by examiner

*Primary Examiner* — Edward Glick
*Assistant Examiner* — Sang V Nguyen
(74) *Attorney, Agent, or Firm* — Lowe Hauptman Ham & Berner, LLP (57) ABSTRACT

A transflective display device includes a display panel and a light-gathering unit. The display panel includes a plurality of transmission regions and reflection regions, and has an upper surface and a lower surface. The light-gathering unit is directly disposed and positioned on the upper surface of the display panel, and includes a plurality of light-gathering elements, which are corresponding to the reflection regions respectively.

17 Claims, 7 Drawing Sheets

TRANSFLECTIVE DISPLAY DEVICE AND METHOD FOR ASSEMBLING THE SAME

CROSS REFERENCE TO RELATED APPLICATION

This application claims the priority benefit of Taiwan Patent Application Serial Number 098120930, filed on Jun. 23, 2009, the full disclosure of which is incorporated herein by reference.

TECHNICAL FIELD

The invention is related to a method for assembling a transflective display device, and more particularly to a transflective display device including light-gathering units, whereby lights of a backlight module can be efficiently transmitted through transmission regions of a display panel, and ambient lights can be efficiently reflected from reflection regions of the display panel.

BACKGROUND

With the development of high-tech applications, video products, e.g. digital video or image device have become popular products at everyday existence. In the digital video or image device, a liquid crystal display device is an importance element for displaying the correlative information. A user can read the required information from the liquid crystal display device.

Generally, liquid crystal display (LCD) devices are classified according to their illumination sources. The transmissive liquid crystal display (LCD) device has advantages of high contrast ratio and good color saturation. However, the transmissive LCD device may provide low image contrast when ambient light is bright. In addition, its power consumption is high due to the need of a backlight source. On the other hand, a reflective LCD device uses ambient light, instead of backlight, for displaying images. Therefore, its power consumption is relatively low. However, the image provided by the reflective LCD device is less visible when ambient light is dark.

Figure 1:
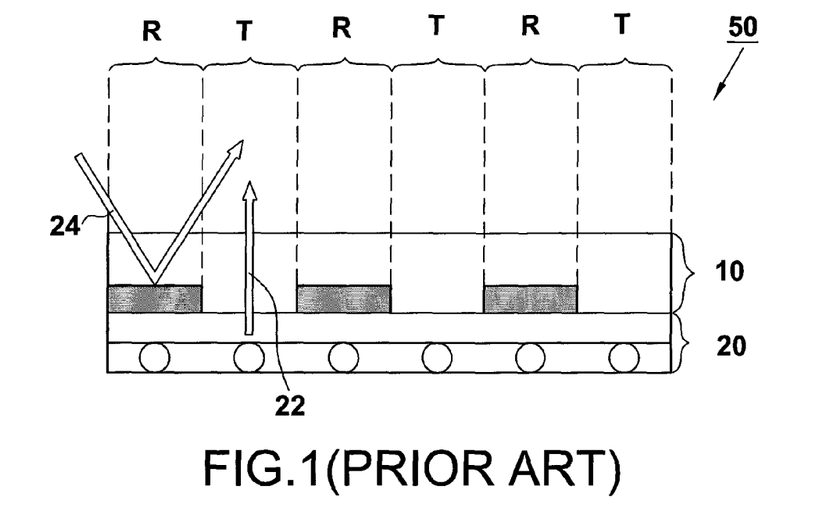
FIG. 1 is a cross-sectional view of a transflective LCD device in the prior art.

In order to overcome the above-mentioned disadvantages of the transmissive and reflective LCD devices, a transflective LCD device is developed. Referring to FIG. 1, it depicts a transflective LCD device 50 including a display panel 10 and a backlight module 20.

Figure 2:
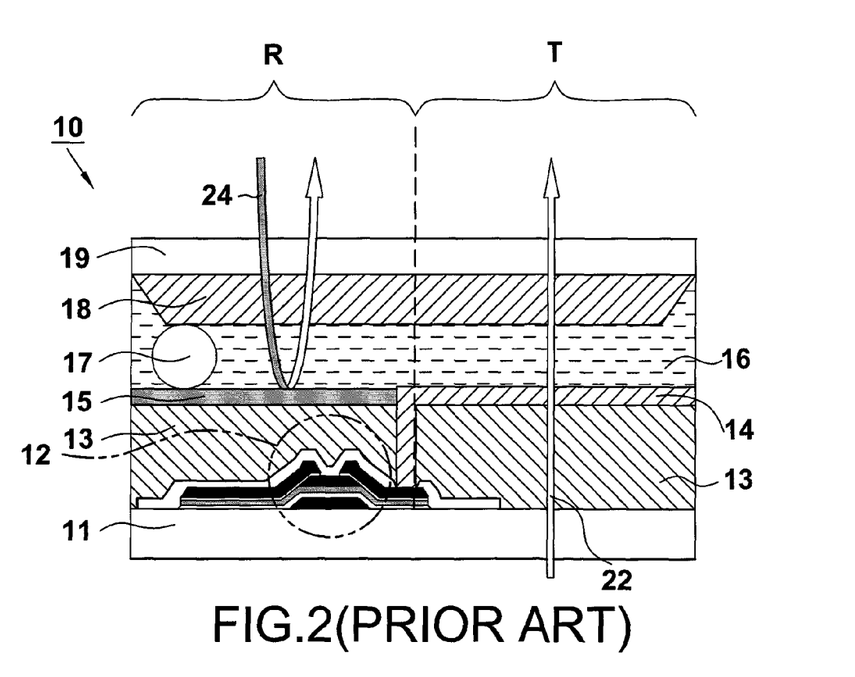
FIG. 2 is a cross-sectional view of a display panel in the prior art.

Referring to FIG. 2, each pixel of the display panel 10 has two regions, which are a transmission region "T" and a reflection region "R." The display panel 10 includes a first substrate 11, a thin film transistor (TFT) 12, an insulating layer 13, a transparent electrode 14, a reflective electrode 15, a liquid crystal layer 16, a spacer 17, a color filter layer 18 and a second substrate 19. The TFT 12 is disposed on the first substrate 11. The insulating layer 13 is disposed above the TFT 12 and the first substrate 11. The transparent electrode 14 and the reflective electrode 15 are disposed above the insulating layer 13, and are located in the transmission region "T" and the reflection region "R" respectively. The color filter layer 18 is disposed under the second substrate 19. The liquid crystal layer 16 is disposed between the transparent electrode 14 and the color filter layer 18, and is disposed between the reflective electrode 15 and the color filter layer 18. The spacer 17 is disposed on the transparent electrode 14 or the reflective electrode 15 for keeping a fixed cell gap.

Each pixel of the display panel 10 has the transmission region "T" and the reflection region "R," and thus lights 22 of the backlight module 20 can be transmitted through the transmission region "T" of the display panel 10, and ambient lights 24 can be reflected from the reflection region "R" of the display panel 10. It can provide an image even in dark surroundings and with low power consumption.

However, according to the conventional transflective LCD device 50, lights 22 of the backlight module 20 are not efficiently transmitted through the transmission region "T" of the display panel 10, and simultaneously ambient lights 24 are not efficiently reflected from the reflection region "R" of the display panel 10. Thus, the prior art cannot provides a clearer image.

Accordingly, there exists a need for a transflective display device capable of solving the above-mentioned problems.

SUMMARY

The present invention provides a transflective display device including a display panel and a light-gathering unit. The display panel includes a plurality of transmission regions and reflection regions, and has an upper surface and a lower surface. The light-gathering unit is directly disposed and positioned on the upper surface of the display panel, and includes a plurality of light-gathering elements, which are corresponding to the reflection regions respectively. The transflective display device further includes a backlight module directly disposed on the lower surface of the display panel.

The display panel has the transmission regions and the reflection regions, and the light-gathering elements of the light-gathering unit of the present invention have the light-gathering effect. Thus, lights of the backlight module can be transmitted through the transmission regions of the display panel, and ambient lights can be efficiently reflected from the reflection regions of the display panel, i.e. a part of ambient lights which is not originally reflected can reach the reflection regions. The light-gathering unit of the present invention can efficiently increase the illumination of the reflection regions so as to provide a clearer image.

The foregoing, as well as additional objects, features and advantages of the invention will be more apparent from the following detailed description, which proceeds with reference to the accompanying drawings.

BRIEF DESCRIPTION OF THE DRAWINGS

Embodiments of the present invention are illustrated by way of example, and not by limitation, in the figures of the accompanying drawings, wherein elements having the same reference numeral designations represent like elements throughout and wherein.

DETAILED DESCRIPTION OF THE PREFERRED EMBODIMENT

Figure 3:
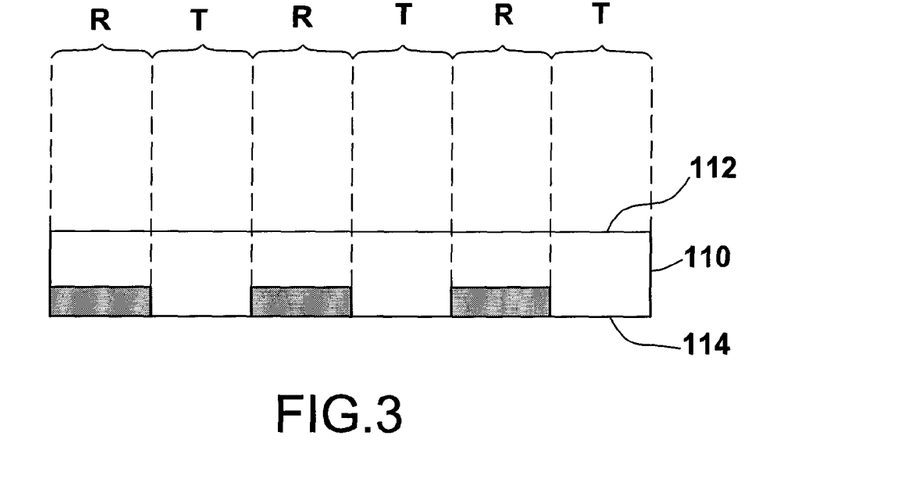
FIGS. 3 to 6 are cross-sectional views showing a method for assembling a transflective display device according to the first embodiment of the present invention.

Referring to FIGS. 3 to 6, they depict a method for assembling a transflective display device according to the first embodiment of the present invention. Referring to FIG. 3, a display panel 110 is provided, wherein the display panel 110 includes a plurality of transmission regions "T" and reflection regions "R," and has an upper surface 112 and a lower surface 114. More detailed, the display panel 110 includes an upper substrate (i.e. the first substrate 11, shown in FIG. 2) and a lower substrate (i.e. the second substrate 19, shown in FIG. 2). A liquid crystal layer (i.e. the liquid crystal layer 16, shown in FIG. 2) is located between the upper and lower substrates. A reflective electrode (i.e. the reflective electrode 15, shown in FIG. 2) is located between the liquid crystal and the lower substrate. A region with the reflective electrode is substantially defined as the reflective regions "R," and a region without the reflective electrode is substantially defined as the transmission regions "T."

Figure 4:
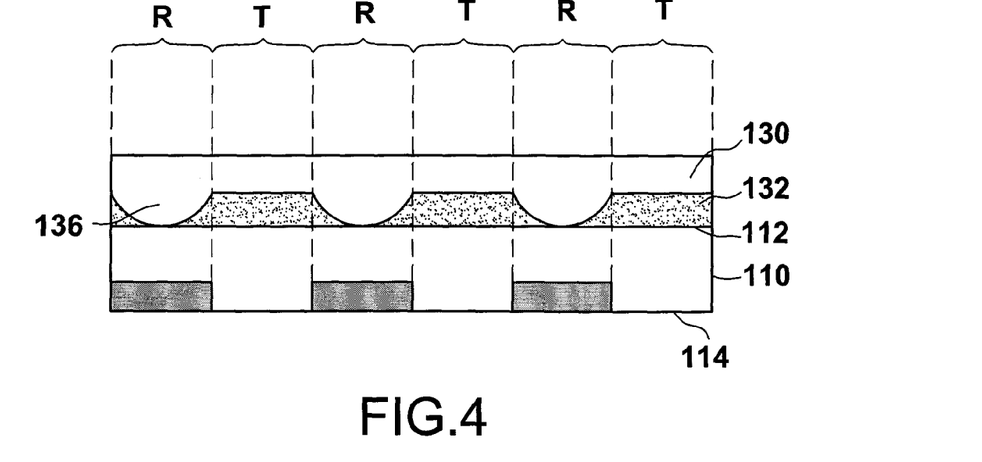

Referring to FIG. 4, a light-gathering unit 130 is directly disposed and positioned on the upper surface 112 of the display panel 110, wherein the light-gathering unit 130 includes a plurality of light-gathering elements 136 respectively corresponding to the reflection regions "R." For example, an adhesive material 132 is provided for directly disposing the light-gathering unit 130 on the upper surface 112 of the display panel 110. Then, a positioning device (not shown) is provided for positioning the light-gathering unit 130 on the upper surface 112 of the display panel 110. Finally, the adhesive material 132 is solidified for mounting the light-gathering unit 130 on the upper surface 112 of the display panel 110. The refractive index of the adhesive material 132 is less than that of the light-gathering unit 130 so as to avoid affecting the light-gathering effect. When the light-gathering unit 130 is directly disposed on the upper surface 112 of the display panel 110, the size of the light-gathering element 136 is small than or equal to (i.e. not bigger than) that of the reflection region "R." Thus, the light-gathering element 136 has micro-structure corresponding to the reflection region "R." The micro-structures of the light-gathering elements 136 are formed by photolithography & etching processes. The light-gathering element 136 can be a convex lens. A cross-section of the convex lens can be semi-circle or semi-ellipse. The first light-gathering element 136 is made of transparent material. The transparent material can be acrylic or plastic material.

Figure 5:
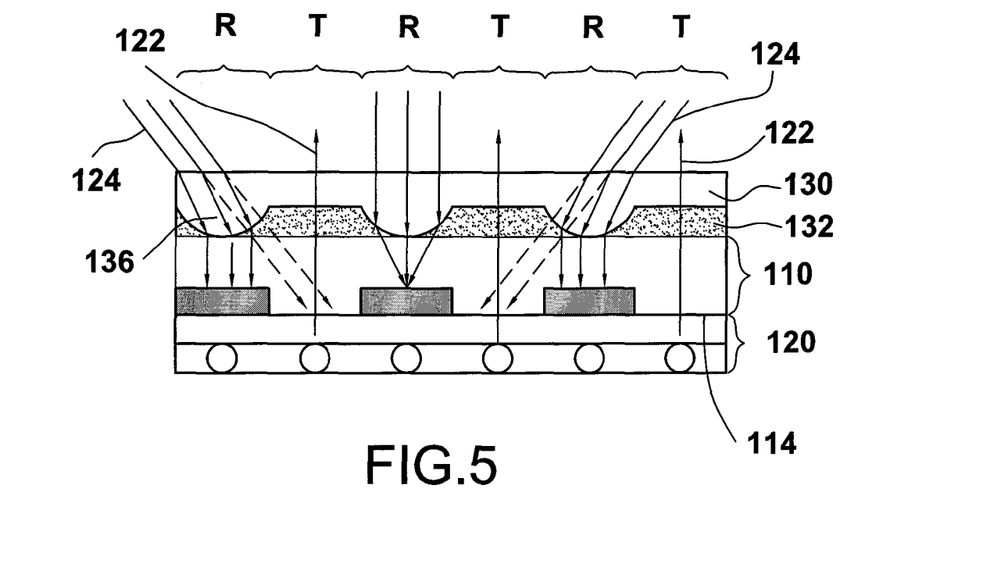

Referring to FIG. 5, a backlight module 120 is directly disposed on the lower surface 114 of the display panel 110. The display panel 110 has the transmission regions "T" and the reflection regions "R," and the light-gathering elements 136 of the light-gathering unit 130 of the present invention have the light-gathering effect. Thus, lights 122 of the backlight module 120 can be transmitted through the transmission regions "T" of the display panel 110, and ambient lights 124 can be efficiently reflected from the reflection regions "R" of the display panel 110, i.e. a part of ambient lights 124 which is not originally reflected can reach the reflection regions "R." The light-gathering unit 130 of the present invention can efficiently increase the illumination of the reflection regions "R" so as to provide a clearer image.

Figure 6:
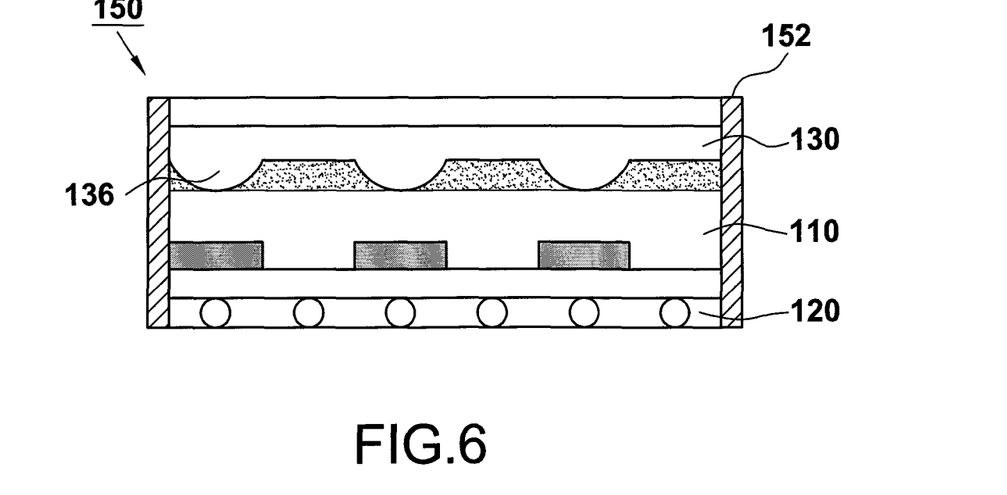

Referring to FIG. 6, a front frame 152 is assembled with the backlight module 120, thereby mounting the light-gathering unit 130 and the display panel 110 between the front frame 152 and the backlight module 120 so as to form the transflective display device 150 of the present invention.

Figure 7:
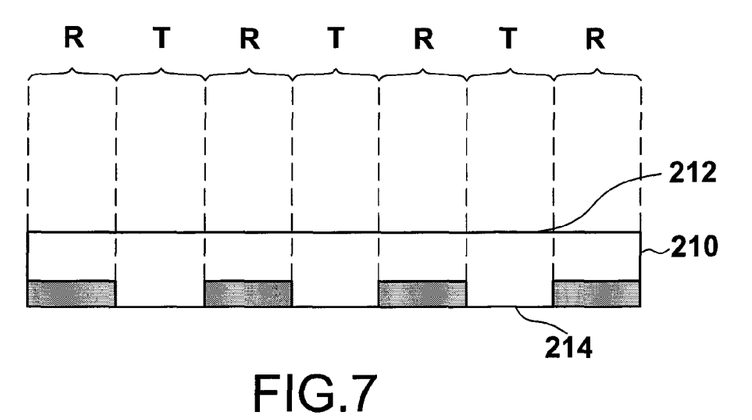
FIGS. 7 to 10 are cross-sectional views showing a method for assembling a transflective display device according to the second embodiment of the present invention.

Referring to FIGS. 7 to 10, they depict a method for assembling a transflective display device according to the second embodiment of the present invention. Referring to FIG. 7, a display panel 210 is provided, wherein the display panel 210 includes a plurality of transmission regions "T" and reflection regions "R," and has an upper surface 212 and a lower surface 214.

Figure 8:
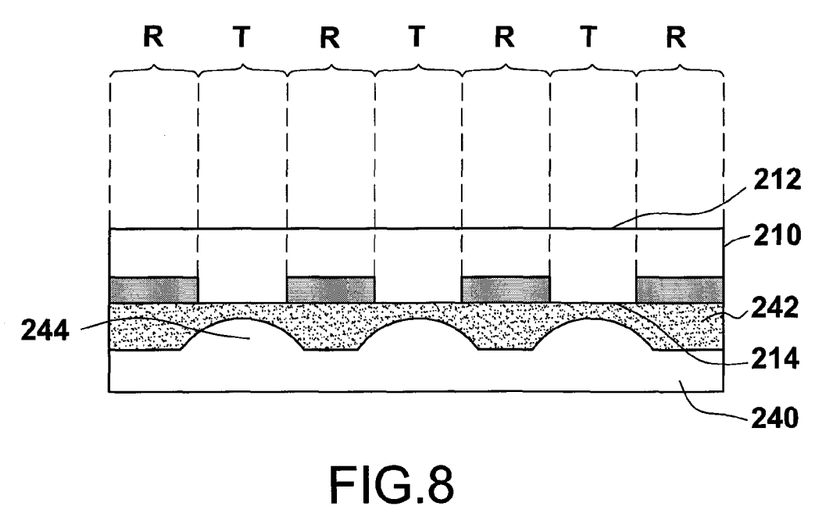

Referring to FIG. 8, a light-gathering unit 240 is directly disposed and positioned on the lower surface 214 of the display panel 210, wherein the light-gathering unit 240 includes a plurality of light-gathering elements 244 respectively corresponding to the transmission regions "T." For example, an adhesive material 242 is provided for directly disposing the light-gathering unit 240 on the lower surface 214 of the display panel 210. Then, a positioning device (not shown) is provided for positioning the light-gathering unit 240 on the lower surface 214 of the display panel 210. Finally, the adhesive material 242 is solidified for mounting the light-gathering unit 240 on the lower surface 214 of the display panel 210. The refractive index of the adhesive material 242 is less than that of the light-gathering unit 230 so as to avoid affecting the light-gathering effect. When the light-gathering unit 240 is directly disposed on the lower surface 214 of the display panel 210, the size of the light-gathering element 244 is bigger than or equal to (i.e. not smaller than) that of the transmission regions "T." Thus, the light-gathering element 244 has micro-structure corresponding to the transmission regions "T." The micro-structures of the light-gathering elements 244 are formed by photolithography & etching processes. The light-gathering element 244 can be a convex lens. A cross-section of the convex lens can be semi-circle or semi-ellipse. The first light-gathering element 244 is made of transparent material. The transparent material can be acrylic or plastic material.

Figure 9:
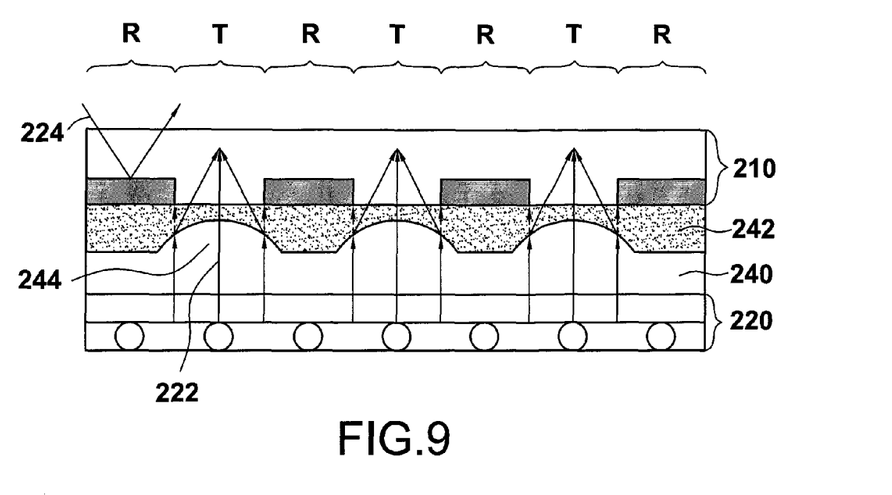

Referring to FIG. 9, a backlight module 220 is directly disposed on the light-gathering unit 240. The display panel 210 has the transmission regions "T" and the reflection regions "R," and the light-gathering elements 244 of the light-gathering unit 240 of the present invention have the light-gathering effect. Thus, lights 222 of the backlight module 220 can be efficiently transmitted through the transmission regions "T" of the display panel 210, i.e. a part of lights 222 of the backlight module 220 which is not originally transmitted can reach the transmission regions "T," and ambient lights 224 can be reflected from the reflection regions "R" of the display panel 210. The light-gathering unit 240 of the present invention can efficiently increase the illumination of the transmission regions "T" so as to provide a clearer image.

Figure 10:
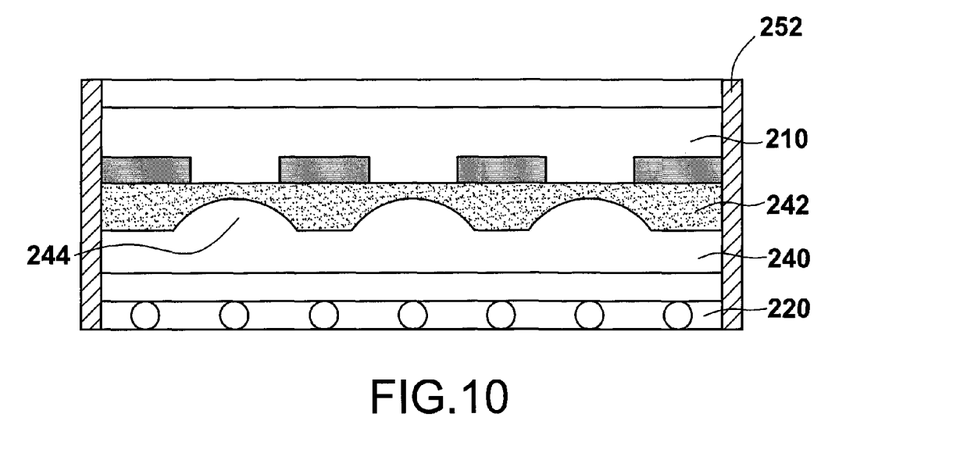

Referring to FIG. 10, a front frame 252 is assembled with the backlight module 220, thereby mounting the light-gathering unit 240 and the display panel 210 between the front frame 252 and the backlight module 220 so as to form the transflective display device 250 of the present invention.

According to the method for assembling the transflective display device of the present invention, the light-gathering unit is firstly positioned on the lower surface of the display panel, and then the backlight module is directly disposed on the light-gathering unit so as to easily finish the positioning step of the light-gathering unit. On the contrary, the positioning step of the light-gathering unit is finished with difficult, if the light-gathering unit is firstly directly disposed on the lower surface of the display panel and then the backlight module having the light-gathering unit is positioned on the lower surface of the display panel. Thus, the method for assembling the transflective display device of the present invention can easily finish the positioning step of the light-gathering unit.

Figure 11:
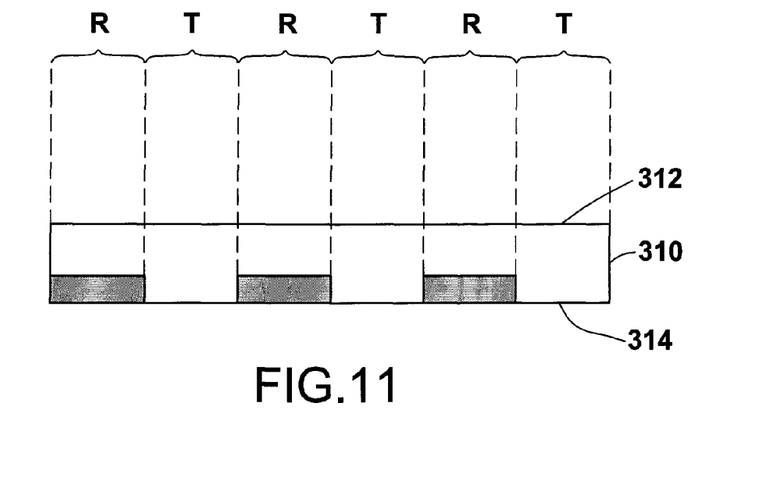
FIGS. 11 to 14 are cross-sectional views showing a method for assembling a transflective display device according to the third embodiment of the present invention.

Referring to FIGS. 11 to 14, they depict a method for assembling a transflective display device according to the third embodiment of the present invention. Referring to FIG. 11, a display panel 310 is provided, wherein the display panel 310 includes a plurality of transmission regions "T" and reflection regions "R," and has an upper surface 312 and a lower surface 314.

Figure 12:
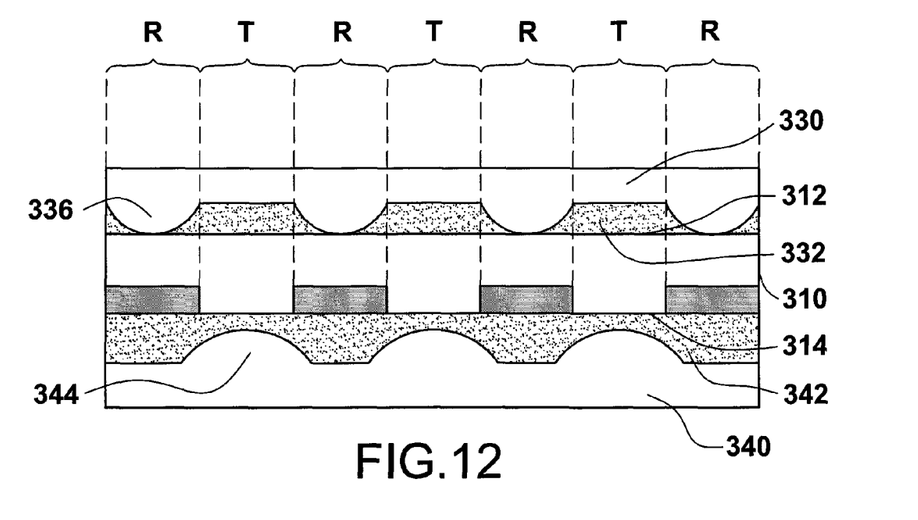

Referring to FIG. 12, first and second light-gathering units 330, 340 are directly disposed and positioned on the upper and lower surfaces 312, 314 of the display panel 310 respectively, wherein the first light-gathering unit 330 includes a plurality of light-gathering elements 336 respectively corresponding to the reflection regions "R," and the second light-gathering unit 340 includes a plurality of light-gathering elements 344 respectively corresponding to the transmission regions "T." For example, adhesive materials 332, 342 are provided for directly disposing the first and second light-gathering units 330, 340 on the upper and lower surfaces 312, 314 of the display panel 310 respectively. Then, a positioning device (not shown) is provided for positioning the first and second light-gathering units 330, 340 on the upper and lower surfaces 312, 314 of the display panel 310 respectively. Finally, the adhesive materials 332, 342 are solidified for mounting the first and second light-gathering units 330, 340 on the upper and lower surfaces 312, 314 of the display panel 310 respectively.

Figure 13:
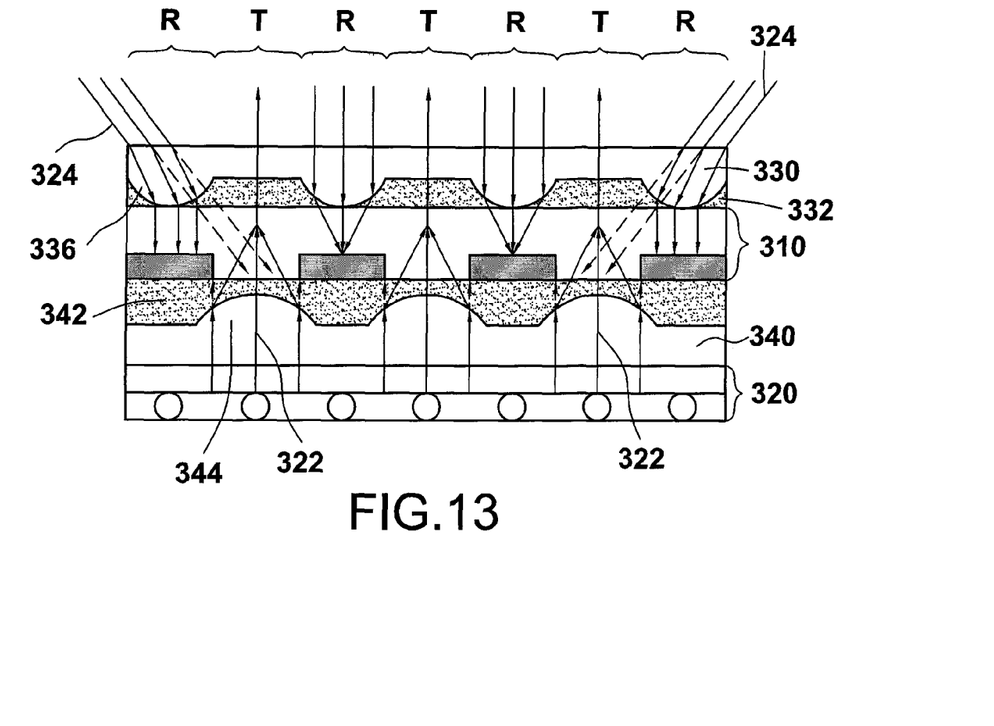

Referring to FIG. 13, a backlight module 320 is directly disposed on the second light-gathering unit 340. The display panel 310 has the transmission regions "T" and the reflection regions "R," and the light-gathering elements 336, 344 of the first and second light-gathering units 330, 340 of the present invention have the light-gathering effect. Thus, lights 322 of the backlight module 320 can be efficiently transmitted through the transmission regions "T" of the display panel 310, i.e. a part of lights 322 of the backlight module 320 which is not originally transmitted can reach the transmission regions "T," and simultaneously ambient lights 324 can be efficiently reflected from the reflection regions "R" of the display panel 310, i.e. a part of ambient lights 324 which is not originally reflected can reach the reflection regions "R." The first and second light-gathering units 330, 340 of the present invention can efficiently increase the illuminations of the transmission regions "T" and the reflection regions "R" so as to provide a clearer image.

Figure 14:
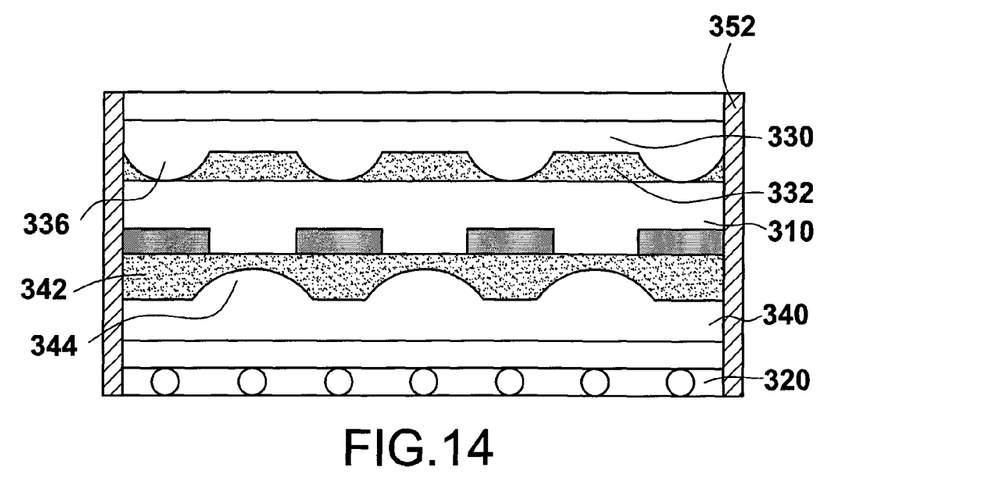

Referring to FIG. 14, a front frame 352 is assembled with the backlight module 320, thereby mounting the first light-gathering unit 330, the display panel 310 and the second light-gathering unit 340 between the front frame 352 and the backlight module 320 so as to form the transflective display device 350 of the present invention.

According to the method for assembling the transflective display device of the present invention, the second light-gathering unit is firstly positioned on the lower surface of the display panel, and then the backlight module is directly disposed on the second light-gathering unit so as to easily finish the positioning step of the light-gathering unit. On the contrary, the positioning step of the second light-gathering unit is finished with difficult, if the second light-gathering unit is firstly directly disposed on the lower surface of the display panel, and then the backlight module having the second light-gathering unit is positioned on the lower surface of the display panel. Thus, the method for assembling the transflective display device of the present invention can easily finish the positioning step of the second light-gathering unit.

Although the invention has been explained in relation to its preferred embodiment, it is not used to limit the invention. It is to be understood that m any other possible modifications and variations can be made by those skilled in the art without departing from the spirit and scope of the invention as hereinafter claimed.

What is claimed is:

1. A transflective display device, comprising:
   a display panel comprising a plurality of transmission regions and reflection regions, and having an upper surface and a lower surface; and
   a first light-gathering unit directly disposed on the upper surface of the display panel, and comprising a plurality of first light-gathering elements positioned corresponding to the reflection regions, respectively, wherein a size of each of the first light-gathering elements is not larger than that of the corresponding one of the reflection regions.

2. The transflective display device as claimed in claim 1, further comprising:
   a first adhesive material for mounting the first light-gathering unit on of the upper surface of the display panel.

3. The transflective display device as claimed in claim 2, wherein a refractive index of the first adhesive material is less than that of the first light-gathering unit.

4. The transflective display device as claimed in claim 1, wherein the first light-gathering element includes a convex lens.

5. The transflective display device as claimed in claim 4, wherein a cross-section of the convex lens is one of semi-circle and semi-ellipse.

6. The transflective display device as claimed in claim 1, wherein the first light-gathering elements are made of transparent material.

7. The transflective display device as claimed in claim 1, further comprising:
   a backlight module disposed on the lower surface of the display panel.

8. The transflective display device as claimed in claim 1, further comprising:
   a second light-gathering unit directly disposed on the lower surface of the display panel, and comprising a plurality of second light-gathering elements positioned corresponding to the transmission regions, respectively.

9. The transflective display device as claimed in claim 8, further comprising:
   a second adhesive material for mounting the second light-gathering unit on the lower surface of the display panel.

10. The transflective display device as claimed in claim 8, further comprising:
    a backlight module disposed on the second light-gathering unit.

11. A method of assembling a transflective display device, the method comprising the steps of:
    providing a display panel, comprising a plurality of transmission regions and reflection regions, and having an upper surface and a lower surface;
    directly disposing and positioning a first light-gathering unit on the upper surface of the display panel, wherein the first light-gathering unit comprises a plurality of first light-gathering elements respectively corresponding to the reflection regions, and a size of each of the first light-gathering elements is not larger than that of the corresponding one of the reflection regions;
    directly disposing and positioning a second light-gathering unit on the lower surface of the display panel, wherein the second light-gathering unit comprises a plurality of second light-gathering elements respectively corresponding to the transmission regions;
    directly disposing a backlight module on the second light-gathering unit; and
    assembling a front frame with the backlight module, thereby mounting the first light-gathering unit, the display panel and the second light-gathering unit between the front frame and the backlight module so as to form a transflective display device.

12. The method as claimed in claim 11, wherein the step of directly disposing and positioning the first light-gathering unit on the upper surface of the display panel comprises:

providing a first adhesive material for directly disposing the first light-gathering unit on the upper surface of the display panel;

providing a positioning device for positioning the first light-gathering unit on the upper surface of the display panel; and solidifying the first adhesive material for mounting the first light-gathering unit on the upper surface of the display panel.

13. The method as claimed in claim 11, wherein the first light-gathering elements are formed by photolithography and etching processes.

14. The method as claimed in claim 11, wherein the step of directly disposing and positioning the second light-gathering unit on the lower surface of the display panel comprises:

providing a second adhesive material for directly disposing the second light-gathering unit on the lower surface of the display panel;

providing a positioning device for positioning the second light-gathering unit on the lower surface of the display panel; and solidifying the second adhesive material for mounting the second light-gathering unit on the lower surface of the display panel.

15. The method as claimed in claim 11, wherein the second light-gathering elements are formed by photolithography and etching processes.

16. A method of assembling a transflective display device, the method comprising the steps of:

providing a display panel, comprising a plurality of transmission regions and reflection regions, and having an upper surface and a lower surface;

directly disposing and positioning a light-gathering unit on the upper surface of the display panel, wherein the light-gathering unit comprises a plurality of light-gathering elements respectively corresponding to the reflection regions, and a size of each of the first light-gathering elements is not larger than that of the corresponding one of the reflection regions;

directly disposing a backlight module on the lower surface of the display panel; and assembling a front frame with the backlight module, thereby mounting the light-gathering unit and the display panel between the front frame and the backlight module so as to form a transflective display device.

17. The method as claimed in claim 16, wherein the step of directly disposing and positioning the light-gathering unit on the upper surface of the display panel comprises:

providing an adhesive material for directly disposing the light-gathering unit on the upper surface of the display panel;

providing a positioning device for positioning the light-gathering unit on the upper surface of the display panel; and solidifying the adhesive material for mounting the light-gathering unit on the upper surface of the display panel.

* * * * *